United States Patent [19]

Takács et al.

[11] 4,345,720
[45] Aug. 24, 1982

[54] APPARATUS FOR THE TREATMENT OF SOLID, GRANULAR AND/OR LUMPY MATERIALS

[75] Inventors: István Takács; Endre Vereczkey; Gyula Bosits; György Kerey, all of Budapest, Hungary

[73] Assignee: Richter Gedeon Vegyészeti Gyár Rt., Budapest, Hungary

[21] Appl. No.: 97,971

[22] Filed: Nov. 28, 1979

[30] Foreign Application Priority Data

Mar. 21, 1979 [HU] Hungary .............................. RI 700

[51] Int. Cl.³ .............................................. B02C 23/10
[52] U.S. Cl. ...................................... 241/74; 209/288; 241/79.3
[58] Field of Search ....................... 241/74, 79.2, 79.3, 241/188 R, 70, 71, 72, 79; 209/234, 235, 240, 241, 245, 288, 289

[56] References Cited

U.S. PATENT DOCUMENTS

2,825,453  3/1958  Lanquist ........................ 209/288 X
2,959,362  11/1960  Smith et al. .................... 241/79.2 X

FOREIGN PATENT DOCUMENTS

1017839  10/1957  Fed. Rep. of Germany ..... 241/79.2

*Primary Examiner*—Mark Rosenbaum
*Attorney, Agent, or Firm*—Karl F. Ross

[57] ABSTRACT

A rotary sieve comprises, in an elongated housing, a body which is rotatable about a substantially horizontal axis and has, at one end, a frustopyramidal drum widening in the direction of the other end and a zigzag tube communicating eccentrically with the drum. The planar walls of the drum and the tube are perforated sieves and the material is introduced by a worm centrally into the drum and is progressively advanced through the body to be discharged generally centrally from the tube through a discharge drum of the body which is peripherally open so that the material can be collected by a pipe underlying the discharge drum.

7 Claims, 12 Drawing Figures

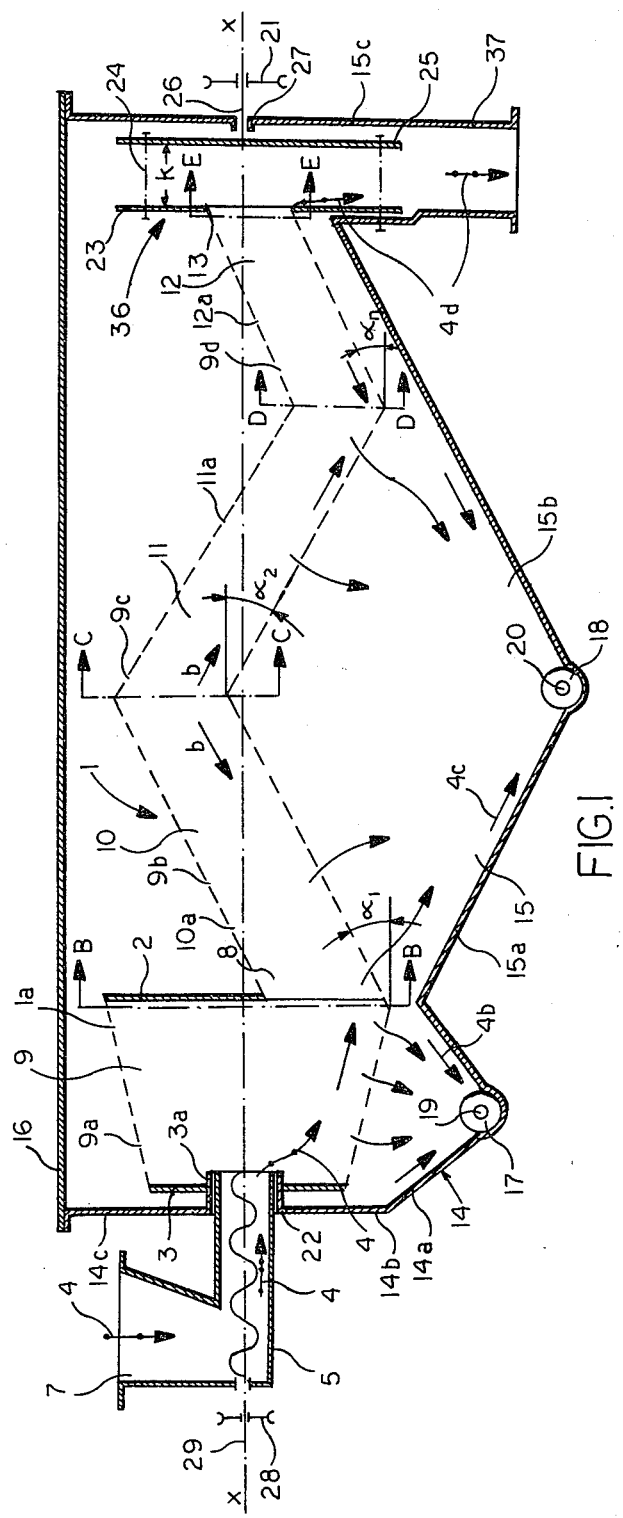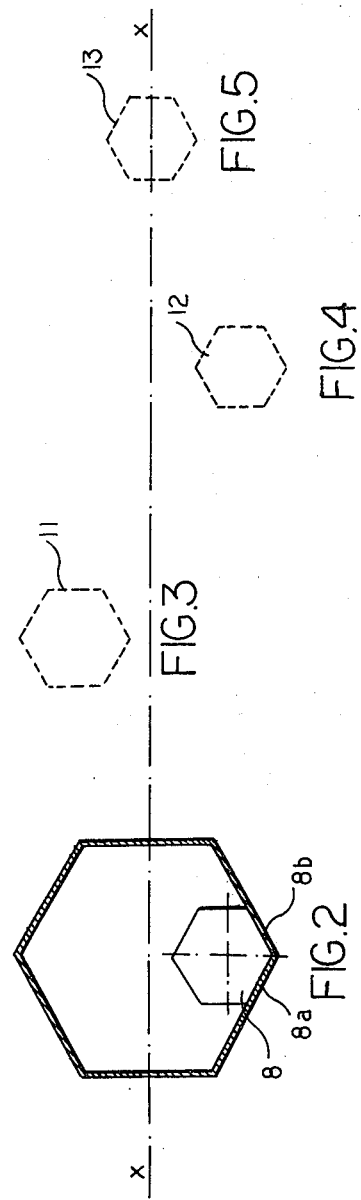

APPARATUS FOR THE TREATMENT OF SOLID, GRANULAR AND/OR LUMPY MATERIALS

FIELD OF THE INVENTION

The invention relates to equipment for the grading of solid, granular and/or lumpy materials (particulate material) according to grain size, and/or for separation of solid—e.g. impure—components from such materials.

BACKGROUND OF THE INVENTION

Several fields of industry require the grading of the cut-up lumpy solid materials, granulated and similar materials according to grain size in order to prevent further disintegration of the grains in the course of separation. In several cases a cleaning task, such as removal of the impurities, e.g. waste wood, textile fibers, pieces of paper, coarse grains sticking together after cutting up from the solid mass of material coming out of the drier, prior to further processing, possibly before packing, is required. In this case generally there is no need for grading.

For these purposes various types of sieves are used with a variety of disadvantages.

One of the frequently used sieve systems employs a screening cylinder where the sieve frame is fastened to the cylindrical self-carrying framework. The geometrical longitudinal axis of the cylinder is at a slight dip to the horizontal, and the cylinder rotates around this axis. The mass of material to be sieved is carried into the cylinder, passing in the direction of the slope toward the outlet orifice, while part of its falls through the sieve.

Another known type of rotary screening drum is the prismatic sieve, the cross section of which is polygonal (e.g. hexagonal, or octogonal), otherwise it is identical with the above-mentioned screening cylinder. A disadvantage of such screening drums is that only ¼th to 1/6th of the surface is operative; thus the specific output is low; the material to be graded is arranged in the drum at an angle, consequently higher power is required for rotation of the drum; at too low a speed the layer of material is too thick, while at too high a speed the grains get squeezed into the sieve apertures, thereby causing clogging.

OBJECT OF THE INVENTION

The object of the invention is to provide an apparatus for the purpose described which has a small size and favorable operational parameters (e.g. low energy utilization, high specific separation capacity).

Another object of the invention is to provide an improved apparatus for the removal of the impurities, e.g. fibrous materials, paper, textile scraps, fragments, etc., from the granular mass of material.

SUMMARY OF THE INVENTION

The apparatus of the invention comprises a horizontally arranged drum-like sieve rotating around the horizontal axis and defined by flat plates. The sieve is divided into two parts in such a way that the first part is a truncated pyramid shaped drum, while the other part consists of several prismatic members connected in sawtooth-like arrangement with each other, and the mantle of both parts is comprised of sieve (e.g., perforated plates).

The truncated pyramid forming the first part is arranged symmetrically around the horizontal axis, while the first prismatic member of the second part is arranged eccentrically in relation to the horizontal axis and at an angle to the horizontal.

With this system separation of the first fraction of minimum grain size, delivery of the retained mass of material into the first member of the second part and substantial extension of the dwelling period of the mass of material in the second part and finally discharge of the mass of retained material from the second part can be ensured, whereby separation of the fractions can be efficiently accomplished within the same equipment.

According to the invention a feeder pipe leads into the interior of the first part through its smaller end plate. The second part of the sieve body joins the orifice in the larger end plate and has a minimum of three oblong drum-like sieve members leading into each other, the sides of which—at least in part—are formed by planar sieve walls and the geometrical symmetry axes of the sieve members together form sawtooth-like or similar line and they intersect the geometrical axis of the screening drum outside the screening drum, which forms the first part. The symmetry axis is the common rotation axis of the sieve members forming the second part. It is advantageous when the sieve body is located in a housing, the bottom plate of which is shaped in a zig-zag line forming suitably one or several troughs. Troughs can be formed separately under the first and second part. A mechanism, e.g. a screw conveyor, is located in the lower part of the troughs for removal of the fractions separated by sieving, suitably in the outlet pipes or similar devices.

According to a further invention criterion the shape of the screening drum forming the first part is that of a truncated pyramid and its cross section perpendicular to the longitudinal geometrical symmetry axis has the shape of a regular hexagon. Cross sections of all the sieve members may be of identical shape and size in their full length, or the cross sectional dimension of the sieve members can gradually decrease from the connection point of the screening drum to the outlet.

It is advantageous when the shape and size of the eccentric orifice developed in the larger end plate of the screening drum are identical in cross sectional shape and size with the joining end of the sieve member connected to the screening drum, and the circumference of the eccentrically arranged orifice developed in the larger end plate of the screening drum partly coincides with the circumference of the end plate.

The eccentrically arranged orifice can be of regular hexagon shape and its two sides coincide with a certain part of the two sides of the larger end plate in the second part. Angles of the geometrical symmetry axes of the sieve members to the horizontal are identical or decrease from the screening drum toward the outlet.

The sieves should be selected always according to the grading or cleaning task to be solved. The sieves fastened on the frame should be simply replaceable, which is necessary as a result of the wear.

A central orifice can be formed in the smaller end plate of the screening drum through which a horizontal pipe for feeding in the material to be graded and/or cleaned, passes into the interior of the screening drum, the fixed pipe fitting into a rotary bearing located in the central orifice of the end plate. A mechanism carrying the material, suitably a screw conveyor, is arranged in the pipe and the pipe ends in a throat, or similar device.

In another embodiment of the invention, the sieve member furthest from the screening drum, leads into a drum open at least in part circumferentially and rotatable together with the sieve body. This drum is provided suitably with vertical discs spaced from each other; the drum is located in the housing at its end opposite the screening drum. Underneath this drum a pipe leads downwards out of the housing for discharge of the fraction retained on the sieve body after sieving. According to a further invention criterion a central shaft is fixed to the outer disc facing the rear end plate of the housing which is carried in a bearing fixed preferably in the rear end plate of the house and the shaft is fitted with a driving disc preferably outside the housing connected with a drive.

In several industrial sectors it is necessary to cut up the solid granular or lumpy material before grading, for which a separate grinder is used at the present. A preferred embodiment of the invention provides that the cutting device is arranged in the interior of the screening drum that forms the first part. The cutting device is formed suitably by a grinding head which consists of a perforated grinding body and a grinding unit revolving in it.

The mesh size of the sieve surfaces of the screening drum and sieve members may be identical, or the mesh size of the screens covering the screening drum and the sieve members increases from the inlet of the material to be graded and/or cleaned toward the outlet of the fraction retained on the sieve body, while the mesh size of the individual sieve body parts is suitably identical.

Finally, according to a further favorable invention criterion the apparatus is provided with a device for moving the sieve body with its longitudinal geometrical axis up and/or down from the horizontal.

BRIEF DESCRIPTION OF THE DRAWING

In the drawing:

FIG. 1 is a diagrammatic vertical section taken along the longitudinal geometrical symmetry axis of an apparatus according to the invention;

FIG. 2 is a section taken along line B—B of FIG. 1;

FIG. 3 is a section taken along line C—C of FIG. 1;

FIG. 4 is a section taken along line D—D of FIG. 1;

FIG. 5 is a section of the sieve body along line E—E of FIG. 1;

SPECIFIC DESCRIPTION

Figure 6:
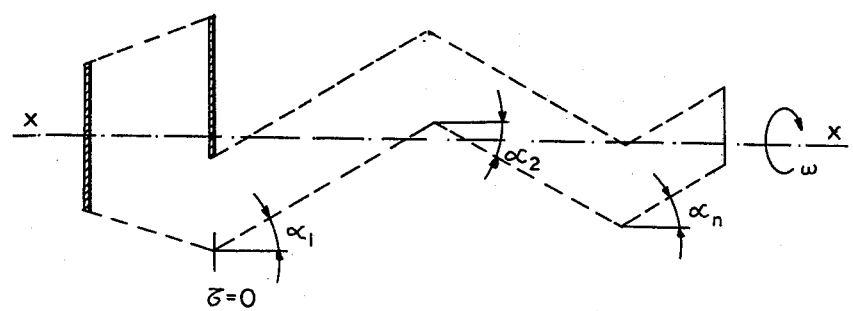
FIG. 6 is a schematic diagram of the sieve body shown in FIG. 1 drawn in smaller scale.

The equipment shown in FIGS. 1–5 has a housing 14 provided with a zig-zag shaped bottom plate 14a, end plates 14b and 15c, and side plates (not shown) closed with a cover 16 on the top.

The sieve body 1 runs in longitudinal direction in the space 15 of housing 14 and has two parts following each other. The first part is formed by a truncated pyramid shaped screening drum 9, while the second part is formed by three prismatic sieve members 10, 11, 12, collectively forming a tube. The screening drum 9 and sieve members 10, 11, 12 are in rigid coupling with each other and have a common horizontal geometrical rotation axis X (shown in dot-dash lines in FIG. 1).

The end plates 2, 3 of the screening drum 9 are made of solid flat plate, are of regular hexagon shape and are vertically positioned.

The smaller end plate 3 faces the end plate 14b of the housing. The larger end plate 2 faces the interior of the housing. A regular hexagonal orifice 8 (see FIG. 2) is formed in place 2 eccentrically in relation to the longitudinal axis X in such a way, that its two adjacent sides 8a, 8b coincide with the two adjacent sides of the end plate 2 (FIGS. 1 and 2). The cross sectional area of orifice 8 is suitably a maximum of half of the cross sectional area of end plate 2.

A central orifice 3a is formed in the smaller end plate 3 of the screening drum 9, through which a horizontal pipe 5 of fixed position leads into the interior of the screening drum. The pipe 5 is surrounded by a bearing 22 fitted into the orifice 3a of end plate 3, i.e. the pipe 5 serves as the mechanical rotation axis of the whole sieve body 1, because the bearing 22 rotates around it.

Screw conveyor 6 is arranged in pipe 5,—throat 7 leading into its outer end from above. Driving wheel 28 is mounted on the shaft 29 of the screw conveyor 6 outside the pipe 5 connected with the drive.

A circular disc 23 is rigidly connected with the end of the last prismatic sieve member 12 (i.e. the end of the tube 10, 11, 12). A further circular disc 25 is joined to and parallel with disc 23 with spacing k connected with the aid of staybolts 24. Disc 23 has a central orifice 13 with the sieve member 12 leading into it. Disc 25 is rigidly coupled with shaft 26 fitting into and running through bearing 27 built into the rear end plate 15c of housing 14. This shaft 26 coincides with the longitudinal geometrical symmetry axis X, i.e. with the geometrical rotation axis. The driving wheel 21 is mounted on the shaft 26 and connected with the drive (not shown). Thus the discs 23 and 25 together form a drum 36 open along its circumference and rotatable together with the sieve body 1. Under this drum 31 is a pipe 37 leading downward from the housing 14 for discharge of the solid matter retained in and passing out of the sieve body 1.

The mesh sizes of the planar sieve surfaces 9a, 9b, 9c, 9d covering the screening drum 9 that forms the sieve body 1, and sieve members 10, 11, 12 may be identical, but passing from the inlet orifice 3 toward the outlet orifice 13 the mesh size may be gradually reduced, suitably in such a way, that sieve 4a has the smallest and sieve 9d the largest mesh size.

Operation of the equipment according to FIG. 1 is the following:

The material to be graded or cleaned is fed (arrows 4) into the throat 7. By screw conveyor 5 it is fed into the screening drum 9. The screening drum 9 together with the sieve body 1 rotates at uniform angular velocity ω, and the grains fall through the holes of sieve 9a that forms the mantle, passing into the trough or basin (arrows 4b). From here the selected fraction is removed by a worm 19 rotating in pipe 17.

Figure 7:
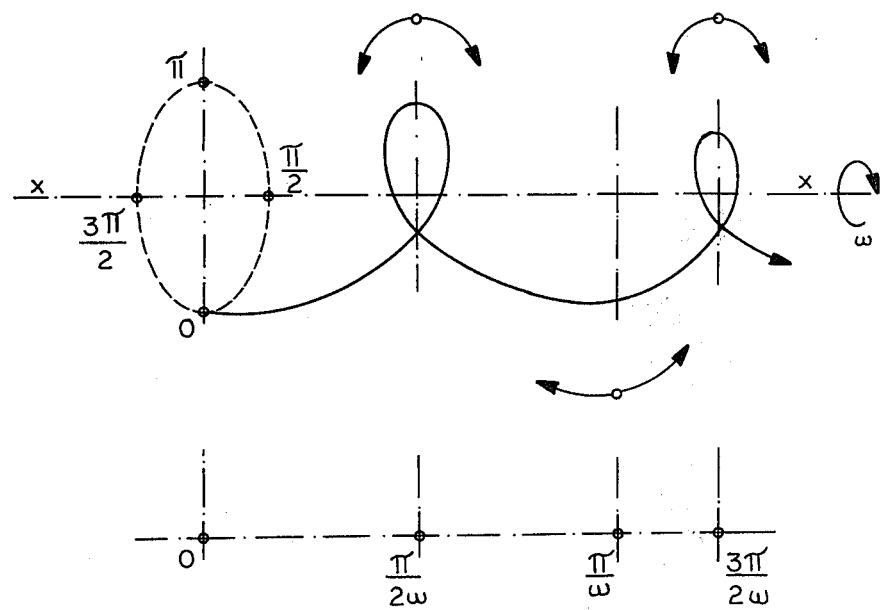
FIG. 7 is a schematic diagram showing the path of movement of the mass of material in the sieve body.

The main bulk or the fraction of the smallest grain size of the mass of material separates in this drum, while the retained material slides down on the sieve surface of the mantle to the orifice 8, through which it passes to the first prismatic sieve member 10 of the tube. In this sawtooth-like assembly of the prismatic sieve members 10–12 forming the second part,—the solid mass of material arriving continuously from the screening drum 9 rotating around the longitudinal geometrical axis X at an angular velocity ω, is displaced continuously on an apparent spiral path (FIG. 7) and, forced into a two-directional forward-backward movement, (see arrows b in FIG. 1) passes ultimately to the outlet orifice 13. The pattern of the movement of the mass of material in the equipment shown diagrammatically in FIG. 6, is shown in FIG. 7. Such movement considerably increases the dwelling period (residence time) of the material in the sieve body 1, thus the whole grading process can be carried out in the same apparatus.

The sliding back of the material and its multidirectional movement on the internal mantle surface, constantly cleans, restores and prevents the surface of the sieve from becoming clogged.

The material remaining in the second part—the largest grain fraction, or the waste to be separated—passes out of the sieve body 1 at a continuous rate through the orifice 13. If the mesh size of the sieves 9a-9d decreases from the inlet to the outlet, then the granular, or lumpy solid mass of material can be divided into several fractions within the same equipment. The material falling into the trough or basin 15b is removed by worm 20 revolving in pipe 18, while the material emerging from the last prismatic sieve member 12 through orifice 13 passes into the drum 36 and out of the equipment through pipe 37.

Cutting up of the solid granular or lumpy material before grading may be necessary.

Figure 12:
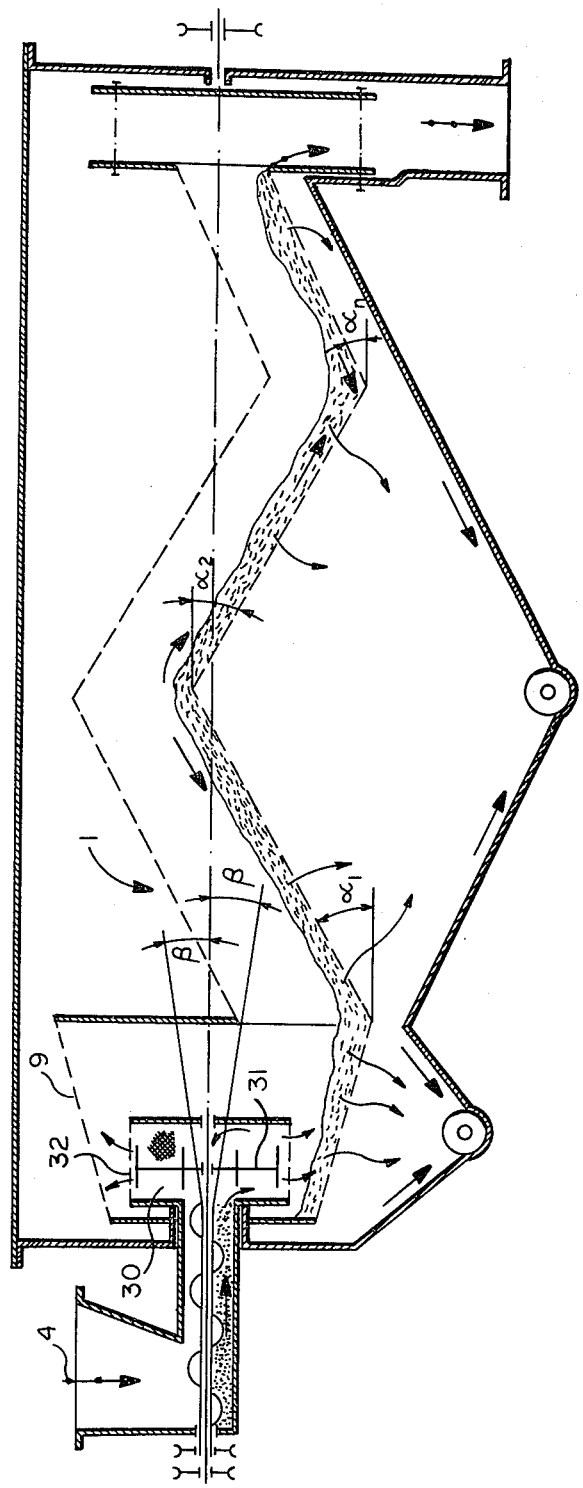
FIG. 12 is a detail of a preferred embodiment of the apparatus according to FIG. 1.

This according to the present invention as shown in FIG. 12 is carried out by a grinding head placed in the interior of the screening drum 9. The solid material to be cut up admitted from the direction marked with arrow 4 is carried into the interior of the grinding body 30 to be cut up by the revolving grinding unit 31. The cut-up material passes into the interior of the screening drum 9 in the grain size given by the perforations 32, and its grading takes place in the already described manner.

Means is provided by which the longitudinal geometrical symmetry axis X of the whole sieve body 1 can be displaced at an angle β upward and downward from the theoretical horizontal axis. This way the dwelling period of the solid material in the equipment can be regulated (extended or reduced).

Figure 8:
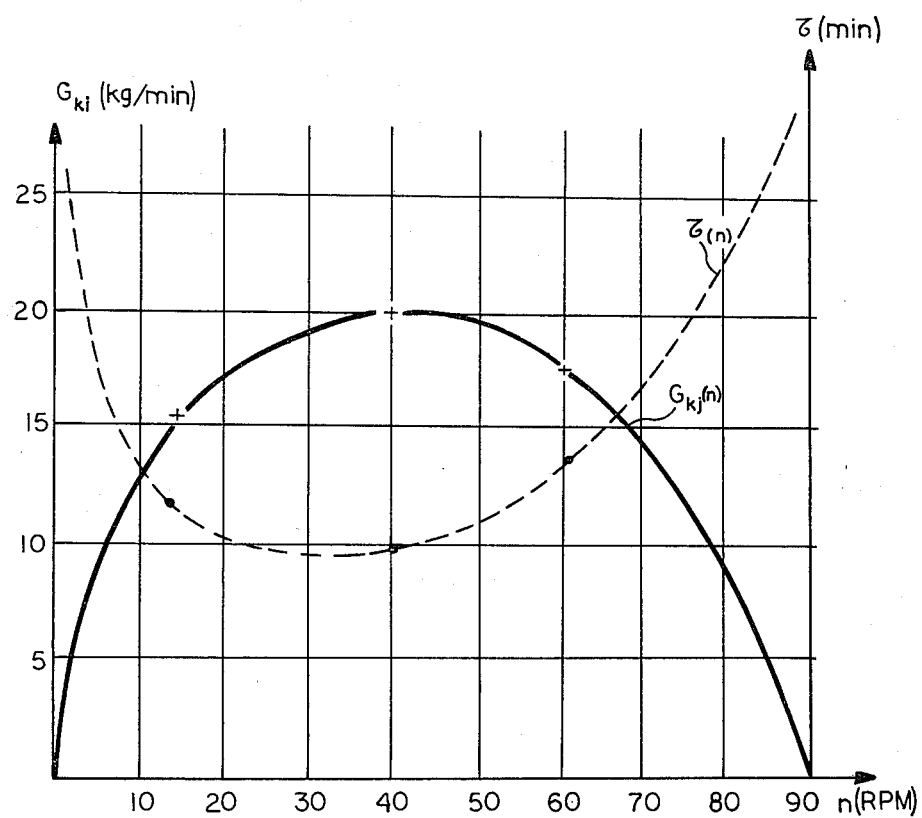
FIG. 8 is a graph showing the residence time of the solid mass of material in the apparatus as a function of the speed.

Dwelling period of the solid matter in the equipment can be regulated also by variation of the speed of sieve body 1 as shown by the graph in FIG. 8. The r.p.m. values n of sieve body 1 are shown along the abscissa while the $G_{kl}$ (kg/min) values on the ordinate represent the admissible solid matter quantity. Thus by variation of the speed of sieve body 1 the dwelling period of the solid mass of material in the same equipment can be varied within wide limits, and in this way various grading or cleaning tasks can be accomplished.

With the suitable variation of the geometrical dimensions of the equipment, apparatuses of diverse purposes can be developed. If, for instance, the angles $\alpha_1-\alpha_n$ are identical, i.e. $\alpha_1=\alpha_2=\alpha_n$, and their value is between 18°-22° (i.e. medium), or greater than 20° (see FIG. 6), then the mass of material in the second part II—moving forward-backward on an apparent spiral path—is being halved, at angles $\alpha_1-\alpha_n$ greater than 20° the movement of the solid material on the sieve surface becomes more intensive, self-cleaning of the surfaces is more effective. At the same time the dwelling period of the material on the sieve surface is average or less. The angles $\alpha_1-\alpha_n$ of above values and mesh size of the sieves 9a-9d to be identical are selected when the apparatus is not used for grading, or at least that is not the primary purpose, but the granular lumpy solid mass of material is first of all to be cleaned, i.e. the lumpy fibrous or similar impure components have to be separated. With the use of such angular values—in the equipment of the same dimension—significant capacity increase can be attained without reducing the effectiveness of the cleaning.

If the angles $\alpha_1-\alpha_n$ are identical and their value is less than 20°, or if the angles are decreasing from the inlet to the outlet, i.e.

$$\alpha_1>\alpha_2>\alpha_n,$$

then the specific dwelling period of the mass of material in the sieve body 1 will increase. Such angles are selected when the equipment is to be used first of all for grading, i.e. the mass of material is to be separated to several grain fractions.

Variation of the cross section of the prismatic sieve members 10, 11, 12 is advisable for several tasks in such a way—as demonstrated by FIGS. 2-5,—that the cross sections should be reduced in the direction of the progress of the solid material.

SPECIFIC EXAMPLES

Experiments were carried out with apparatus as shown in in FIG. 1 but with the following dimensions:

Maximum size (diagonal) of end plate 2 of the truncated pyramid-shaped screening drum 9; length of the drum 9: 300 mm; maximum size (diagonal) of the end plate 3: 240 mm; volume: 15.6 dm$^3$; the second part is formed by three prismatic members, the cross sectional area and dimension of which are identical, maximum size (diagonal): 160 mm; the longitudinal projection of the first two members: 400 mm, that of the last member: 200 mm; the angles vary between $18°<\alpha<22°$. The total length of the complete sieve body—i.e. first and second part—:1320 mm; acid resistant sieve was used with 0.8 mm mesh size. The equipment was operated at 40 r.p.m.; driving motor power output: 2.0 kW. $G_{input}=1250$ kg/h.

Figure 9:
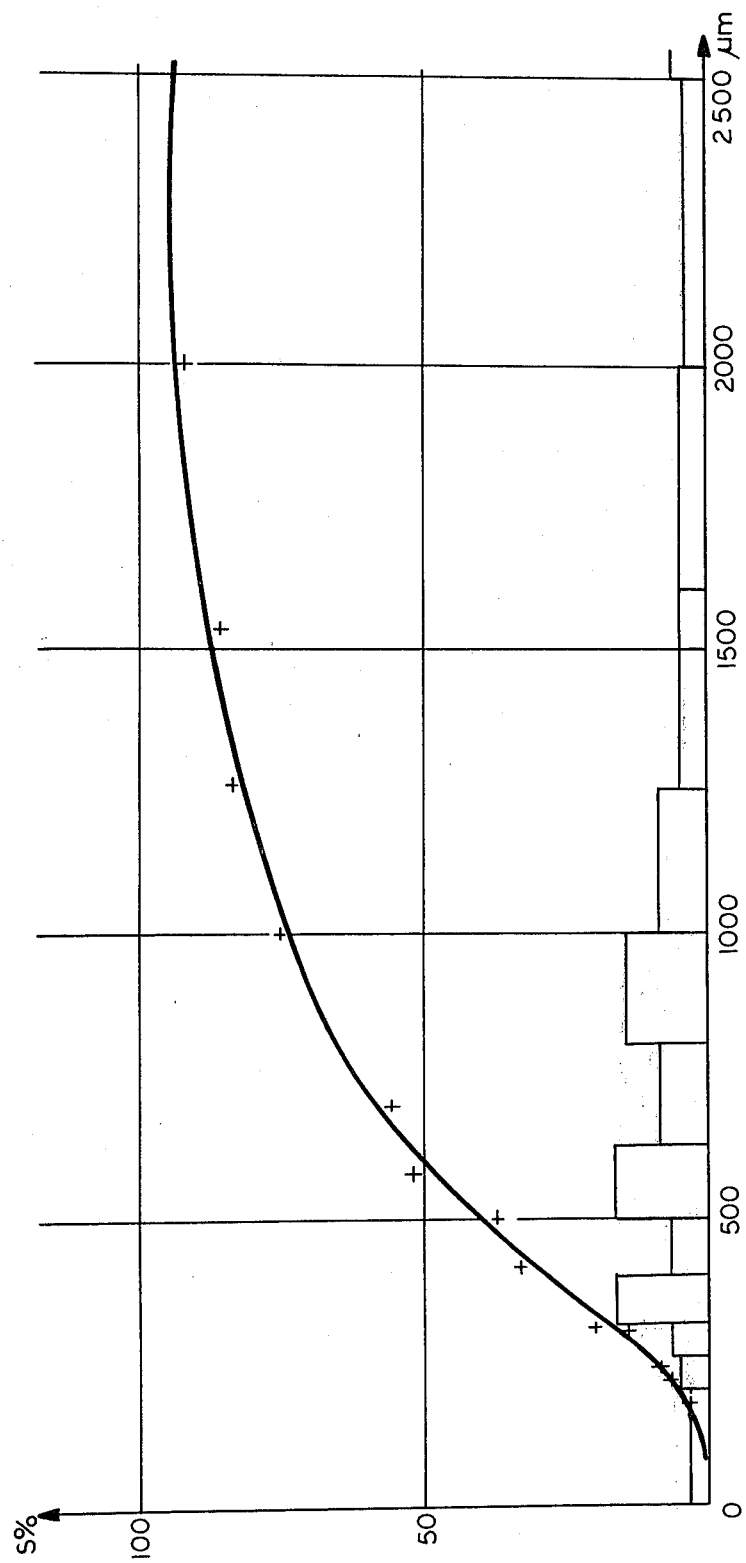
FIGS. 9 to 11 are particle size distribution graphs.
Figure 10:
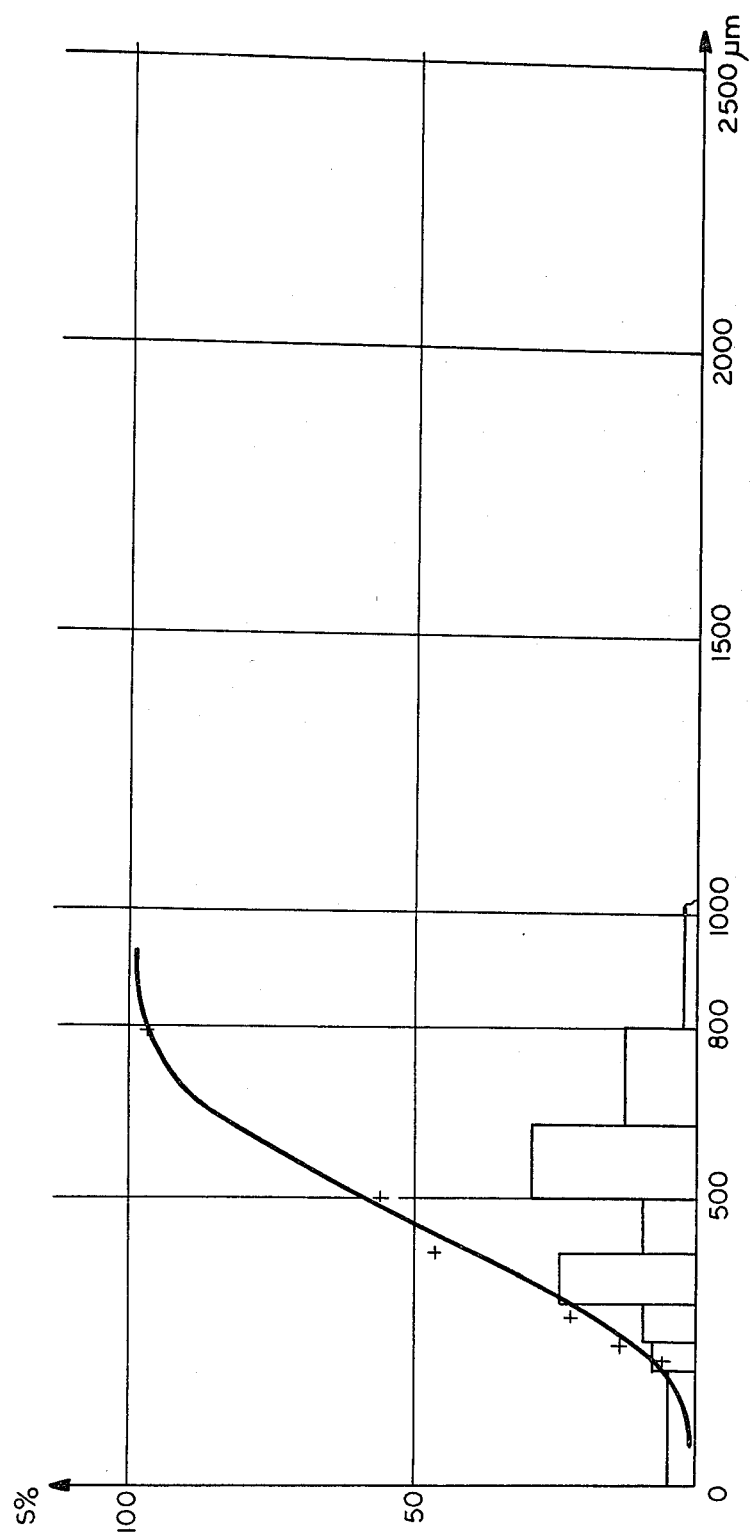
Figure 11:
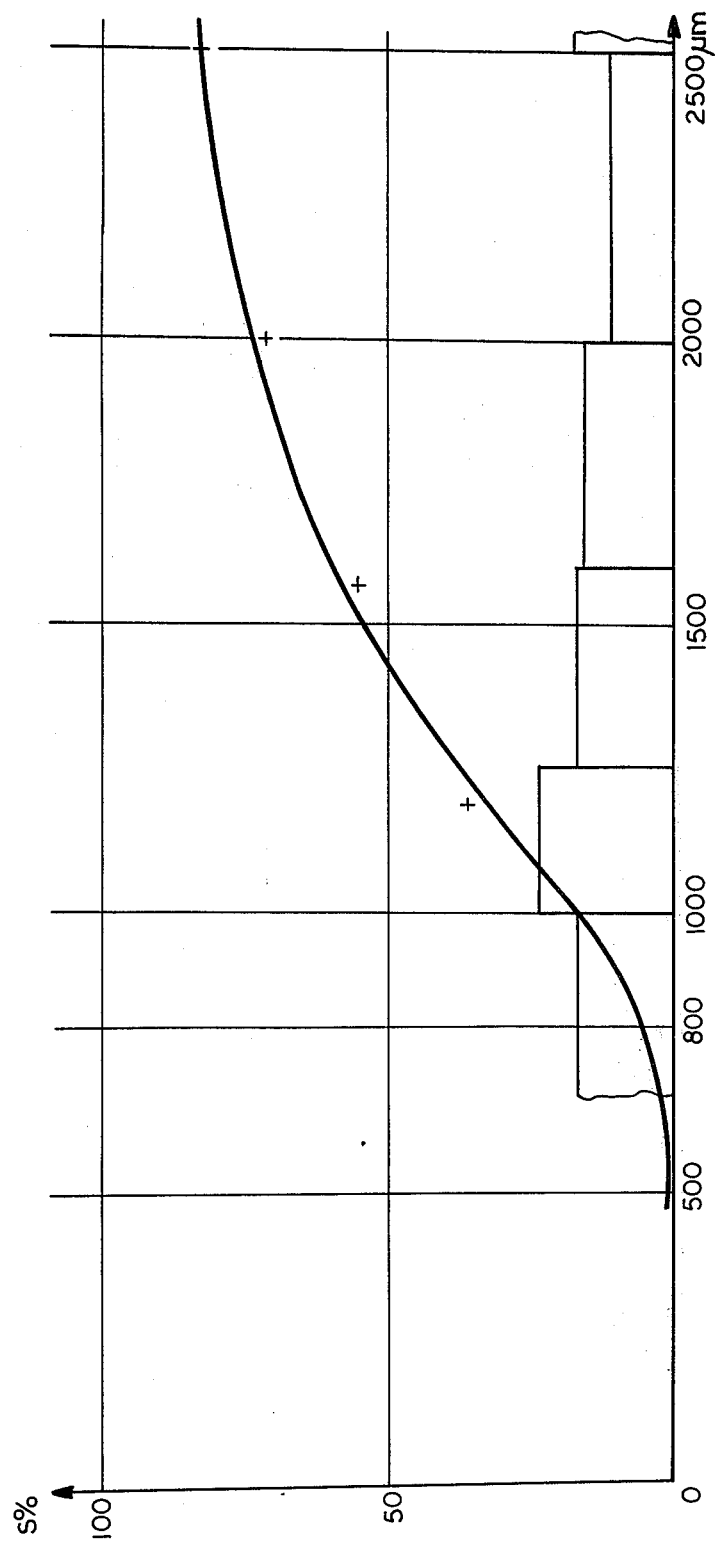

The characteristics obtained in the course of grading the granulated furfurol resin with the above equipment are shown in FIG. 9, while the distribution function and hystogram of the initial material, the 800 μm sieve product and sieve residue are shown in FIGS. 9, 10, 11.

What we claim is:

1. An apparatus for screening solid materials comprising:
    a horizontally elongated housing having a pair of end walls and a bottom formed with means for removing screened material from said housing;
    an elongated rotary sieve body journaled on said end walls for rotation about a generally horizontal axis, said body being formed with
    a sieve drum at one end of said body, said sieve drum having a frustopyramidal configuration and being disposed symmetrically with respect to said axis while being rotatable therearound and having a pair of axially spaced plates, and drum diverging toward the other end of said body and having a periphery formed by planar and perforated sieve surfaces, said drum having central opening in one of said plates disposed proximal to one of said end walls and an opening in an other of said plates which is eccentric to said axis, a generally zigzag-shaped tube communicating with said opening in said other of said plates and formed with at least three angularly adjoining tube sections, each having a polygonal cross section formed by planar sieve walls, and a discharge drum communicating with said tube remote from said frustopyramidal drum and having an open periphery;

means for introducing material to be screened into said frustopyramidal drum through said central opening in said one of said plates whereby some of said material passes through said body with a combined spiraling and back and forth movement and is discharged from the periphery of said discharge drum; and means at an end of said housing in the region of said discharge drum for collecting material discharged therefrom.

2. The apparatus defined in claim 1, further comprising a grinder in said frustopyramidal drum for crushing material fed through said central opening as said material is introduced into said frustopyramidal drum.

3. The apparatus defined in claim 1 or claim 2, further comprising a feeder pipe coaxial with said frustopyramidal drum and extending through said one of said end walls and through said central opening, said feeder pipe being provided with a worm conveyor for introducing said material into said frustopyramidal drum, said frustopyramidal drum being provided with a bearing journaling said body on said feeder pipe.

4. The apparatus defined in claim 1 or claim 2, wherein said discharge drum comprises a pair of parallel plates lying in respective vertical planes and the rods coupling said plates together in spaced relationship, one of said parallel plates being connected to a shaft journaled in the other of said end walls, said means for collecting including a downwardly extending pipe disposed below the space between said parallel plates.

5. The apparatus defined in claim 1 or claim 2 wherein said bottom of said housing is formed with at least two troughs including a first trough beneath said frustopyramidal drum and a second trough below said tube, each of said troughs being provided with means for removing material therefrom.

6. The apparatus defined in claim 1 or claim 2 wherein said tube and said frustopyramidal drum are hexagonal in cross sections perpendicular to said axis.

7. The apparatus defined in claim 1 or claim 2 wherein said eccentric opening is polygonal in configuration and conforms to the cross section of said tube where said tube communicates with said frustopyramidal drum and the periphery of said eccentric opening coincides substantially with the periphery of said frustopyramidal drum over a portion of the periphery of said eccentric opening.

* * * * *